Aug. 29, 1933. E. L. NICHOLS 1,924,564
PARKING METER
Filed May 6, 1931 4 Sheets-Sheet 2
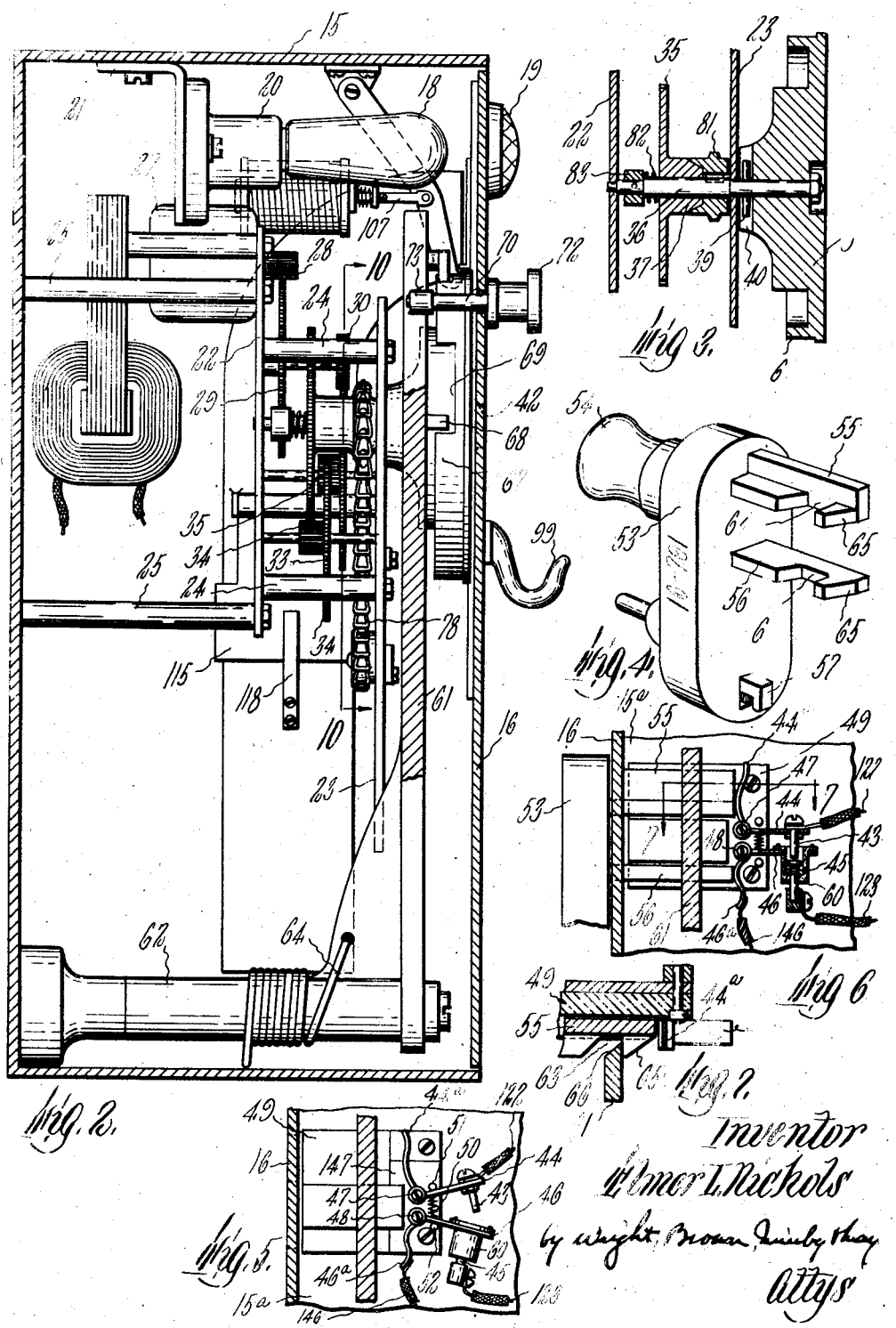

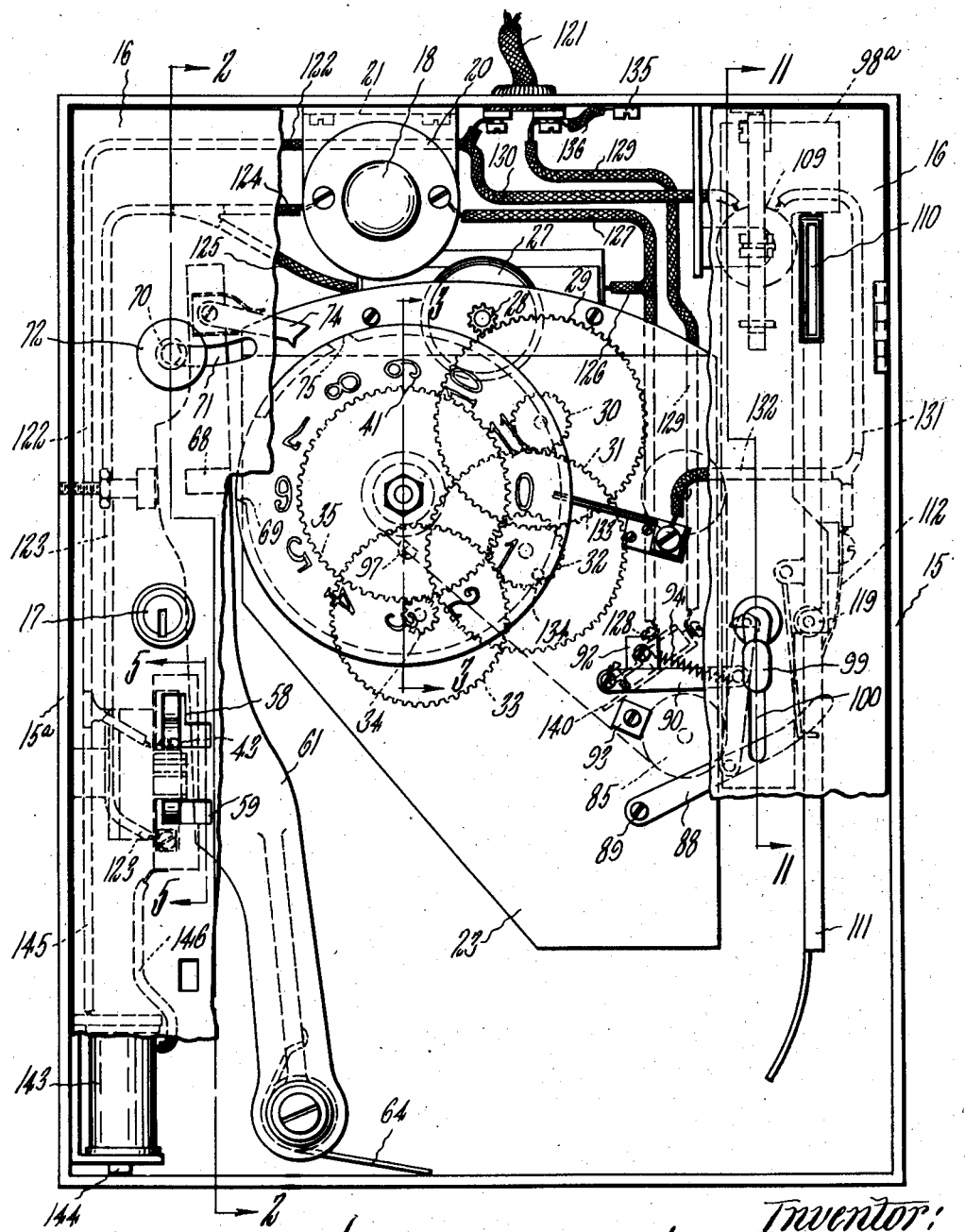

Aug. 29, 1933.    E. L. NICHOLS    1,924,564
PARKING METER
Filed May 6, 1931    4 Sheets-Sheet 3
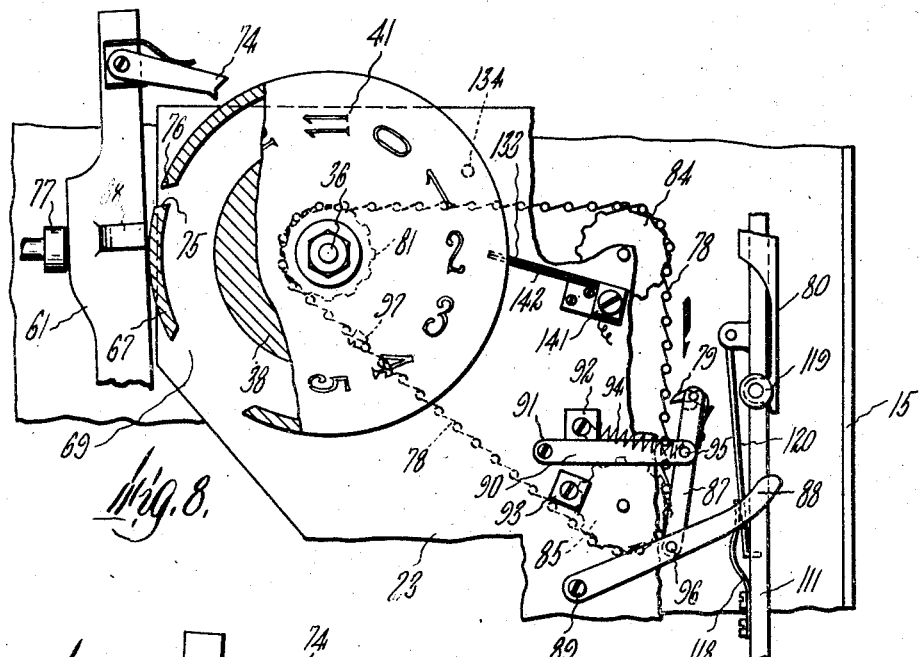
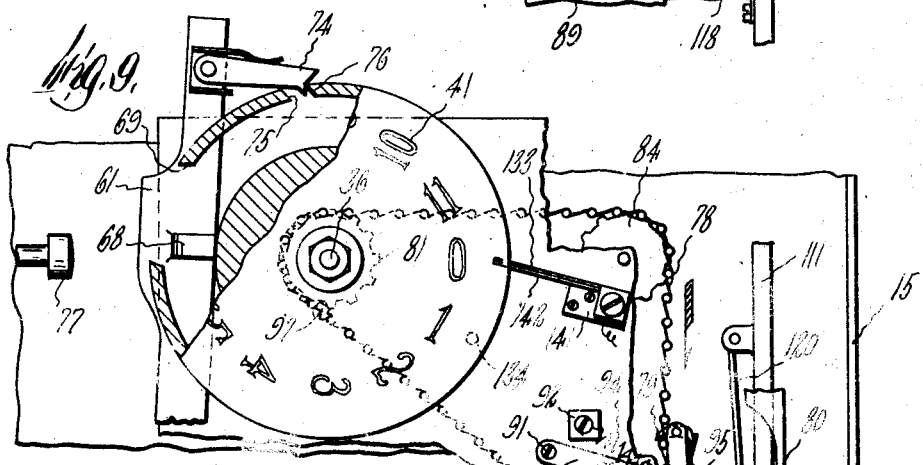
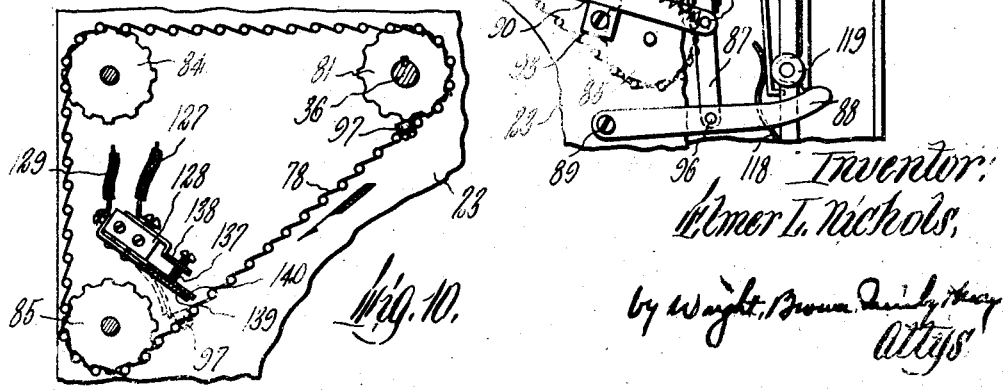
Inventor:
Elmer L. Nichols,
by Wright, Brown, Quinby & May
Attys Aug. 29, 1933.  E. L. NICHOLS  1,924,564
PARKING METER
Filed May 6, 1931   4 Sheets-Sheet 4

Inventor:
Elmer L. Nichols,
by Wright, Brown, Quinby & Henry
Attys.

Patented Aug. 29, 1933

1,924,564

UNITED STATES PATENT OFFICE 1,924,564

PARKING METER

Elmer L. Nichols, Boston, Mass., assignor to Roger W. Babson, Wellesley, Mass.

Application May 6, 1931. Serial No. 535,345

20 Claims. (Cl. 194—17)

The present invention relates to devices and apparatus of the type shown in the prior patent to Roger W. Babson, No. 1,713,839, dated October 15, 1929, for measuring service or accommodation in terms of elapsed time and requiring payment for such service or accommodation, or for a portion thereof. One specific use of the invention, as explained in said patent, is in connection with parked automobiles for measuring and indicating the length of time that a car has occupied a given parking berth, and requiring payment by the owner of the car either for the whole time of parking or for so much of such time as exceeds a period during which free parking is permitted, with which may be combined means for grading the amount of payment exacted in proportion to the duration of parking time.

The primary object of my invention is to provide an apparatus by which the same results are accomplished as set forth in said patent, but having certain improvements calculated to render the machine more rugged and durable, to facilitate the resetting of the indicator to zero position after use and payment, and to introduce manufacturing economies. These objects are accomplished in the machine illustrated in the accompanying drawings representing the preferred embodiment of the invention.

In the drawings,—

Fig. 1 is a front elevation of such machine, represented with the door of the enclosing case broken away and mainly removed;

Fig. 2 is a vertical section on line 2—2 of Fig. 1;

Fig. 3 is an axial section of the timing dial and adjacent parts taken on line 3—3 of Fig. 1;

Fig. 4 is a perspective view of the insertable connector or switch operating plug which forms a part of the complete apparatus;

Fig. 5 is a sectional elevation taken on line 5—5 of Fig. 1 showing the switch above referred to in open circuit position;

Fig. 6 is a view similar to Fig 5 showing the switch in closed circuit position;

Fig. 7 is a detail sectional view taken on line 7—7 of Fig. 6;

Figs. 8 and 9 are fragmentary elevations showing the dial and associated parts in different positions;

Fig. 10 is a fragmentary elevation of the chain by which the dial is reset, the supporting means therefor, and an electric switch controlled thereby, as seen from the opposite point of view to that represented in Figs. 8 and 9;

Like reference characters designate the same parts wherever they occur in all the figures.

Figure 11:
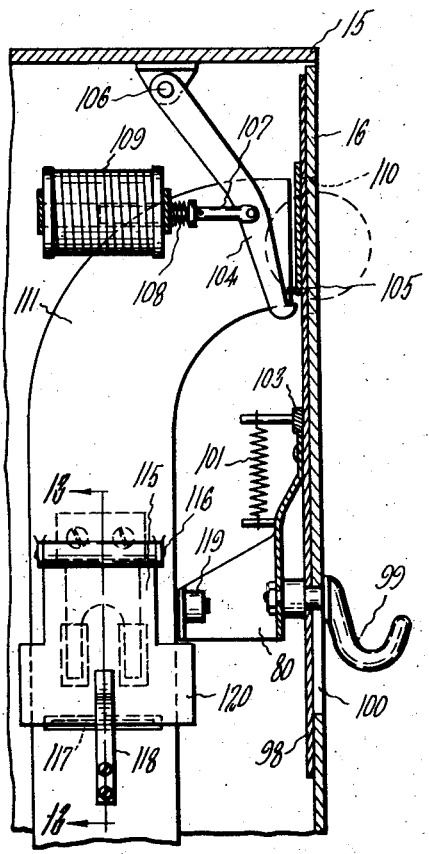
Fig. 11 is a sectional view taken on line 11—11 of Fig. 1, showing the reset actuator in one position.
Figure 12:
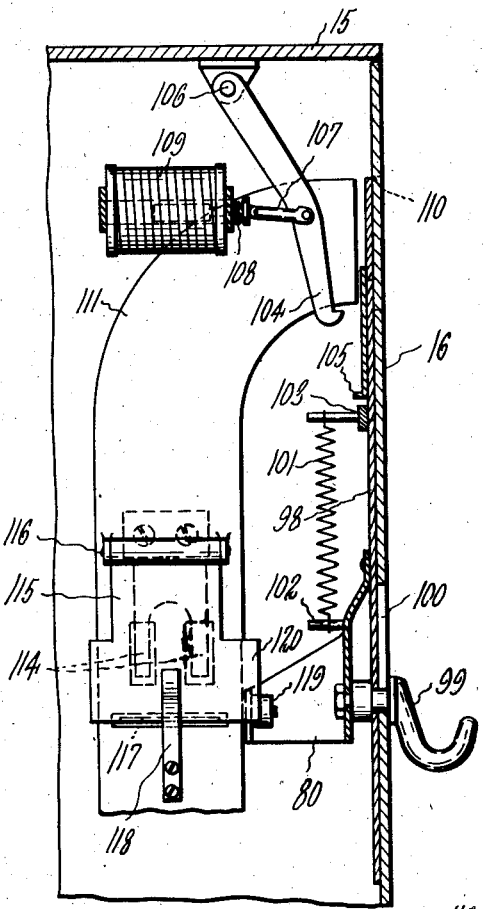
Fig. 12 is a view similar to Fig. 11, but showing the reset actuator in a different position.
Figure 14:
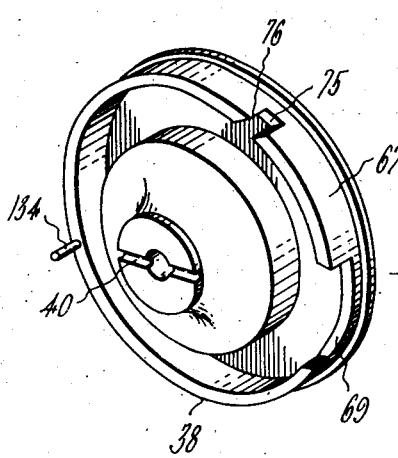
Fig. 14 is a perspective view of the dial as seen from the rear, showing the latch stop and the circuit controller associated therewith.
Figure 13:
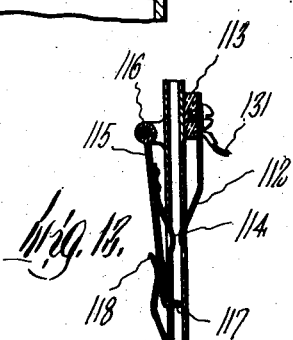
Fig. 13 is a sectional detail taken on line 13—13 of Fig. 11 and showing a part of the coin chute and a detachable coin stop and a switch contact associated therewith.

All the parts of the apparatus except the connector later described are contained in a box or casing 15 having a hinged front door 16 which is normally closed and locked, a common form of lock for that purpose being shown conventionally at 17 in Fig. 1. An electric lamp 18, which typifies any suitable signal device, is located in the case and is visible, when illuminated, through a bull's-eye 19 in the door 16. This lamp is mounted in a lamp socket 20 suspended by a bracket 21 from the top wall of the case, as shown by Fig. 2. A frame comprising plates 22, 23 and spacing posts 24 is supported from the back wall of the case by posts 25 and supports in turn an electric motor 27, and a speed reducing gear train 28, 29, 30, 31, 32, 33, 34 and 35, driven by the motor armature, the last gear 35 of which train is rotatable on a shaft 36 and carries one member 37 of a cone friction clutch. A timing member 38 is mounted on the forward end of shaft 36, being keyed thereto by a pin 39 entering a notch 40, and carries a dial 41 on its flat forward face just back of the door 16, the numbers of which dial are visible singly through a suitably placed window or aperture 42 indicated by dotted lines in Fig. 2. Such window is so placed that it discloses the zero of the dial when the latter is in the position shown in Fig. 1.

The electric motor above described is one of well known type adapted to run on alternating current, which is self-starting when the control circuit is completed and runs synchronously. Generically it typifies any motive apparatus capable of running at a uniform rate of speed. In the combination illustrated it drives the dial counter-clockwise at the rate of one revolution in twelve hours.

A switch, shown in detail in Figs. 5 and 6, is connected in the circuits of the lamp and motor, for opening and closing these circuits. Said switch comprises a contact 43 carried by one arm of a bell crank lever 44 and a complemental contact 45 carried by one arm of a second bell crank lever 46. These levers are pivoted at 47, 48, respectively, on a bracket or holder 49 which is attached to the side wall 15a of the case. Their contact-carrying arms are pressed apart by a spring 50, which tends to hold them in the open circuit position shown in Fig. 5, where they are arrested by stops 51 and 52.

The switch is closed by a connector or plug, shown in Fig. 4, having a body 53, a handle 54, two prongs 55, 56, and a lock 57. The prongs project in parallel from the body and are insertable through openings 58 and 59 in the casing door (Fig. 1). When thus inserted, the prong 55 engages the upstanding arm 44a of bell crank lever 44, and prong 56 engages the depending arm 46a of lever 46, respectively moving these arms so that the switch contacts 43 and 45 are brought together, closing the circuit, as shown in Fig. 6. It will be understood that the length of the prongs and the distance between them, the formation and situation of the bell crank levers, are established of such values as to bring this result to pass.

Both contacts 43 and 45 are insulated electrically from the metallic parts of the casing and its contents, and therefore from the ground; contact 43 being so insulated from its carrying lever by a bushing and washers of a common sort, and the contact 45 by a cup 60 of insulating material, secured to the lever 46, and in which the contact is slidable endwise and supported by a spring, as shown plainly in Fig. 6, so as to permit a certain amount of yielding after the contacts come together and insure closing of the switch when the connector prongs are inserted.

A latch lever 61 is pivoted to a post 62 near the bottom of the casing and swings in a plane near and parallel to the door so that one of its edges may enter alined notches 63 in the prongs, being caused by a spring 64 to enter said notches after having been displaced by the complemental beveled faces 65 and 66 on the end of the prongs and the edge of the latch bar, respectively, (Figs. 6 and 7). Said latch bar is the means here provided for preventing withdrawal of the connector without payment for the occupancy of parking space by an automobile with which the connector is associated.

Such connector may be physically attached to the automobile, but it need not be, and is preferably identified with the automobile, or its owner, by an identifying symbol, as explained and claimed by the before named Roger W. Babson in his application Serial No. 420,269, filed January 11, 1930; this in order to prevent the possessor from escaping the consequences of parking overtime, or failing to pay for the parking privilege, by driving away and leaving the connector. The lock 57 carried by the connector is provided to prevent its being stolen by an unauthorized party; this feature also being an invention claimed by the said Roger W. Babson.

The dial carrying disk 38 serves as a detent to prevent release of the latch 61 except during whatever free parking time may be permitted, or upon resetting of the dial after payment has been made for an extended parking time. For this purpose the disk 38 is provided with a co-axial flange or skirt 67 which travels close beside a lug 68 on the latch lever and across the path in which such lug must move when the lever is displaced to release the connector. A notch 69 is situated in said flange to permit entrance of the lug when the disk is in zero position, and also in any other position within the free parking time limit. A traveler 70 occupies a slot 71 in the casing door and has an external handle or knob 72 and an inward extension 73 overlapping the latch lever, whereby to release the connector at such times. A pawl 74 is carried by the latch lever and engages the edge of a second notch 75 in the flange 67, (which forms in effect a ratchet tooth 76) to return the dial to zero position whenever the latch is released during the free parking period, as shown by Fig. 9. This later notch is preferably of such dimensions that the detent lug 68 cannot pass through it. The stop 77 shown in Figs. 8 and 9 is an abutment to arrest the latch, when the connector has been withdrawn, in a position permitting it to be engaged by the inserted connector as above described.

It will be understood that continued rotation of the dial carrying disk, after expiration of the free parking time, brings the flange 67 into blocking position beside the latch lever lug 68, and continues to block the latch until reset. The means provided for then resetting the disk comprises a sprocket chain 78, a pawl or claw 79 cooperating with the chain, and a coin controlled manually operated impeller 80 for the chain driving pawl; the relations of which with one another and with associated parts will now be described.

The sprocket chain passes around a sprocket wheel 81 which is keyed to the shaft 36, to which the dial disk 38 is also keyed, said sprocket wheel carrying a friction clutch member complemental to the clutch member 37 previously described. It may be explained at this point, with reference to Fig. 3, that the clutch member 37 is pressed against the complemental member by a spring 82 reacting against an abutment 83 on shaft 36, whereby it is enabled to drive the dial disk ahead and to permit slippage of the latter when reset.

The sprocket chain 78 here used is of an inexpensive type frequently used for transmission of small powers, made of wire links bent into approximately U-shape with the extremities of each link coiled around the cross bar element of the next one. It passes around guide sprockets 84 and 85 as well as around the drive sprocket 81, and its stretch between the guide sprockets is the part with which the resetting pawl 79 engages.

Said pawl is carried by one end of a link or carrying bar 87, the opposite end of which is coupled to an actuating arm 88 pivoted at 89 to the frame plate 23. A guiding arm 90 is pivoted to an intermediate point of the carrier bar 87, and to the frame plate 23 at 91, and oscillates about the latter pivot between stops 92 and 93. This guiding arm has an important function of guiding the pawl into engagement with the chain when operated to reset the dial disk, and of withdrawing the pawl clear of the chain when in the position of rest in which it is normally held and returned by the spring 94. To accomplish this effect the pivots 89 and 91 are placed farther apart than the pivots 95 and 96 by which these arms are connected to the pawl carrier 87, and are so placed that in the downward travel, the pivot 95 swings toward the vertical line of the chain and the pivot 96 swings away from such line. In other words, these members are preferably so placed that when in the raised position the arm 90 is approximately horizontal and the arm 88 is inclined upward from its fulcrum point 89, and when fully lowered, the arm 88 is approximately horizontal and arm 90 is downwardly inclined from its pivot 91. Thus lateral movements in relatively opposite directions are imparted at the same time to the pawl carrier at the points 95 and 96, respectively, whereby the pawl is carried entirely clear of the chain in its upward movement, as shown in Fig. 8, and in the course of its downward movement it is brought into engagement with a cross bar of the chain, and thereafter moved far enough to propel the chain by at least the length of one link. The stops 92 and 93 are so placed as to permit this range of movement. The pawl mechanism may be, and preferably is, so designed as to press the upper end of arm 87 against the chain and deflect it between the guide wheels 84 and 85, in order to take up any slack which there may be in the stretch between the drive sprocket 81 and guide wheel 85 so that a block 97, which is carried by the chain, will be positively interengaged with a tooth of the sprocket 81 at the end of the returning movement, whereby the dial will be stopped exactly in zero position. Such block may be readily secured to the chain by a screw passing through one of the links, the edges of the block and circumference of the screw head overlapping the link on opposite faces. The pawl itself is coupled to the carrier bar by a pivot and provided with a stop shoulder and spring, organized in a well known manner to permit yielding of the pawl as it passes the next following link in being returned after a feeding stroke, while being positive to advance the chain.

The impeller 80 previously mentioned is an angular piece of rigid sheet metal which is secured to a slide 98 mounted to slide up and down on the rear side of the casing door 16 and furnished with a hook-shaped handle 99 which is accessible on the outside of the door and the shank of which passes through a slot 100 therein. A spring 101 normally raises the slide 98, being coupled at one end to the slide by means of a pin 102 and anchored at the other end to a pin which projects from a bridge 103 fastened to the door so as to embrace the slide and furnish a guide therefor. The lower edge of the impeller is adapted to engage the outer end of arm 88, which crosses the path of the impeller, and move the arm from its raised to its lowered position.

Coin control of the impeller is effected through the medium of a latch 104 having a toe normally in obstructing position beneath a shoulder or lip 105 on the slide where it prevents descent of the impeller far enough to move the chain. This latch is part of an arm pivoted at 106 and connected by a link 107 with the spring projected core 108 of a solenoid 109, the winding of which is in circuit with separated terminal contacts adapted to be bridged by a coin. There is a coin slot 110 in the casing door beside the slide 98, which registers with the mouth of a coin chute or conduit 111. A spring strip 112 of conducting material, forming one of the switch contacts above referred to, is mounted on and insulated from the side of the chute by an insulating block 113, and has a forked extremity extending into the coin channel through slots in the conduit wall. The complemental contact is a spring member 114 (or a pair of them) projecting through the opposite wall of the chute and in electrical connection therewith through its holder 115. All these parts are of metal, and the chute is secured to the metallic casing in an electrically conductive manner. The holder 115 is a metal plate connected by a pivot 116 to the chute and provided at its lower end with a lip 117 which enters the chute and projects across the channel therein, being projected by a spring 118 bearing on the carrier. Lip 117 provides a gate located to arrest a descending coin of the prescribed denomination so that its upper part lies between the contact springs 112 and 114, in contact with both; said springs being set with a space between them of less width than the thickness of such coin.

The impeller 80 is equipped with a roller or wiper 119 arranged to bear on an inclined cam wing 120 of the holder 115 and crowd the same aside, withdrawing the gate from beneath the deposited coin, in the course of downward travel of the slide 98 and after the lock abutment 105 thereof has passed the toe of latch 104.

Power for operating the electrical parts of this apparatus may be supplied by the electric light and power service of the community in which it is installed, or from any other suitable source whatever. Fig. 1 shows at 121 the cable for supplying power; and shows also the circuits of the various pieces of apparatus. The positive conductor of the cable is connected to a circuit conductor 122 which leads to one of the terminal contacts, as 43 of the main switch, the other contact 45 of which is connected to a conductor 123 which divides into branches 124 and 125, leading to the signal lamp and motor, respectively, whereby these elements are in parallel circuits. The leading out wire 126 from the motor joins a conductor 127 from the lamp which passes to one terminal to a stop switch 128, later described, the other terminal of which is connected by a conductor 129 with the return wire of the cable.

The positive conductor of the cable is also connected in parallel circuit by a wire 130 with one terminal of the solenoid winding 109, the other terminal of which is connected by a wire 131 with the switch contact 112 and by a branch conductor 132 with a terminal contact 133 overlapping the dial disk and adapted to be contacted with at certain times, as presently described, by a pin 134 projecting from the disk. The circuit then made, as well as that made when the coin bridges across between the contacts 112 and 114, is completed through the metallic parts of the inner works and the casing; and the latter is connected to the negative line of the supply cable through a binding screw 135 and wire 136.

Switch 128 is normally closed but adapted to be opened by the block 97 on chain 78 when the dial disk has made a complete rotation. It comprises an adjustable screw contact 137 threaded through a fixed metal plate 138 toward a spring strip contact 139, both plates being secured to a supporting block 128 of insulating material. The spring contact is faced with a sheet of insulating material 140 at the side next to the block or traveler 97 and projecting into the path of the traveler. Thus the traveler is adapted to open the switch without at the same time establishing any secondary path for current.

The terminal contact 133 is mounted on an insulating block 141. It is faced on the side from which the contact pin 134 approaches when driven by the motor, by an insulating strip 142 so that the pin will then deflect it and pass by without closing a circuit. But when the disk is being reset by the step by step action of pawl 79, the pin comes against the bare surface of the contact when at one step of its resetting movement from the zero position, completing a circuit through the conductor 130, solenoid 109, conductor 132, and the metallic parts of the apparatus itself back to the return line of the supply circuit, whereby the impeller is unlocked and permitted to turn the disk through the final step without additional payment. In the present illustration this circuit closing position is reached when the numeral 1 shows through the window in the cover of the casing. Thus when the hour of free parking time has been exceeded, the same actuator which is controlled by the coin may be used for returning the disk to zero position without requiring payment for any more than the excess hours or fractions thereof beyond the free time. It should be noted that the end of the contact 133 and its guarding insulation overlaps the path of pin 134 by a very short amount so that the pin is able to pass by it while rotating through a very small angle.

It will be understood that the principles here disclosed are applicable with obvious modifications of dimensions or arrangement to situations where any amount of free parking time, or none at all, is permitted, and where the rate of payment is of any desired amount for any length of time. Wide variations in the rate of rotation of the dial disk are possible by modifications of the gear train driving such disk. By appropriate design of the sprocket and length of links in the chain, the rotation of the disk with linear movement of the chain equal to the length of one link may be made of any angle desired within wide limits, and the resetting mechanism may be designed with capacity for movement between widely variable limits.

It will be understood that when the automobilist parks the car he merely inserts the prongs of his connector into the openings 58, 59. The motor starts and continues running until either the connector is removed, thus breaking the circuit by opening switch 43, 45, or until the block 97 opens switch 128 when the disk has made a complete revolution, or after any other predetermined length of time. Before the connector can be removed, the latch 61 must be withdrawn from the notches in the sides of the connector prongs, which cannot be done unless the opening 69 in the flange of the disk is beside lug 68 on the latch lever. At such times it is effected by moving the handle 72 to the right. If at the time the handle is so moved the disk is displaced from zero position, pawl 74 connected with the latch lever shifts the disk into exactly the zero position when the handle is moved as far as it will go. If the car has been left more than an hour, the driver can return the disk to the first hour indicating position by depositing as many coins, and pulling the hook 99 downward after each deposit, as the number of hours, or hours and a fraction, of over time during which the car has been parked. When the disk in being reset returns to its first hour indicating position, it may be moved the final step either by the final pull down on the hook 99, without deposit of a coin, or by moving the handle 72. The contacts 133 and 134, which make possible this last step of movement by descent of the hook, are provided in order to eliminate a possible source of confusion. But the handle 72 has to be moved in any event to release the connector, wherefore the contacts 133 and 134 may be omitted if desired and reliance placed on the handle 72 exclusively for turning the disk through its last step of return movement.

A gate 98a is associated with slide 98 arranged to move across the coin slot 110 when the slide is depressed in resetting the dial disk. This gate normally resides above the slot, as shown by dotted lines in Fig. 1. Its purpose and function is to prevent insertion of a second coin until after the slide has been raised, following a previous actuation, high enough to permit engagement of the chain driving pawl with the following link of the chain.

A safeguard is provided to guard against closing of the main switch by any metal object instead of by the prescribed connector. Such safeguard is a solenoid 143 (Fig. 1) having a core 144 which is so arranged as to be alternately driven against a wall of the enclosing box and retracted therefrom with alternations of the current. The winding of this solenoid is in circuit with an extension 145 from the conductor 122, and by a conductor 146 with the arm 46a of bell crank arm 46. This arm is of conducting material and is in conducting relation with arm 44a of bell crank lever 44, through the metal pivots 47 and 48 of these levers, and a metal plate 147 in which these pivots are set. Said plate is mounted on a block 49 of insulating material, which insulates it from the frame. The connector prongs are of non-conducting material so that when they come into contact with the switch levers they do not complete any circuit except that in which the contacts 43 and 45 are connected, but any metal article in the nature of a screw driver, rod or what-not, inserted into either slot to close the switch wrongfully will, when it touches one of the arms 44a or 46a, complete through the metallic casing the circuit in which the solenoid 143 is connected, thereby causing the core of the solenoid to vibrate and hammer the box wall with a loud rattle or buzzing noise, which will call attention of by-standers and officials in the neighborhood.

What I claim and desire to secure by Letters Patent is:

1. In a metering apparatus of the type comprising an enclosed casing having an entrance for a controller body, a lock for securing such body when placed in the entrance, a time mechanism in said casing, and means operated by the time mechanism for obstructing release of the lock; a means for displacing said obstructing means comprising a sprocket chain engaging said obstructing means, a manually actuated chain propelling dog movable back and forth for driving the chain step by step, a lock for preventing such manual actuation, and releasing means for said lock.

2. In a metering apparatus of the character described having a connector securing latch which is displaceable for release of the engaged connector, a movable obstructor and chronometric driving means for moving said obstructor in one direction, the obstructor having an opening arranged in relation with the latch to permit releasing movement thereof during a certain period in the chronometric travel of the obstructor, a pawl carried by the latch arranged to engage the obstructor and propel it in the direction opposite to its chronometric travel when the latch is so moved during any part of said period, and other means for propelling the obstructor in the direction in which it is propelled by said pawl after the end of said period.

3. In an apparatus of the character described, a laterally movable connector latch having a locking lug, a rotatable disk having a skirt adjacent to said lug for obstructing the latch and provided with an opening adapted to admit the lug when beside the latter, a chronometric motor and frictional driving means between the same and the disk for driving the latter, a pawl carried by the latch engageable with the disk for returning the same to starting position when the latch is moved in the manner permitted by the presence of said recess, and other means operable to return the disk from positions in which its skirt obstructs the latch.

4. In an apparatus of the character described having a connector securing latch, a movable obstructor for preventing releasing movement of the latch, a motor and frictional driving means between the motor and obstructor, said obstructor having provisions for permitting releasing movement of the latch when in a certain position only, an elongated member having spaced abutments coupled with said obstructor for being driven thereby and transmitting retrograde movement thereto, and a manually operable impeller for transmitting step by step retrograde movement to said elongated member.

5. In an apparatus of the character described, a manual actuator, a latch for preventing movement of said actuator, means for releasing said latch whereby the actuator can be moved, a latch obstructor, means for driving said obstructor in one direction, the obstructor being adapted to be shifted in the opposite direction into non-obstructing position, a chain connected with said obstructor to be driven thereby and for transmitting movement thereto oppositely to the direction of drive, and a reciprocatively movable chain impeller adapted to engage successive links of the chain and propel the same step by step in the course of its reciprocations, said impeller being arranged for actuation by said manual actuator.

6. In an apparatus of the character described, a motor, a disk frictionally driven by said motor, an endless chain coupled with said disk, a reciprocatably movable pawl or claw for engaging said chain and moving the same oppositely to the direction in which it is normally driven by the disk, and guiding means for the pawl organized to withdraw it clear of the chain and bring it into propelling engagement with a link of the chain, in the course of its opposite reciprocations.

7. The combination with a frictionally driven disk and mechanical means for driving said disk in one direction of an elongated member coupled with said disk for being driven thereby and imparting movement thereto oppositely to the direction of drive, said elongated member having a straight portion with spaced abutments, an impelling pawl engageable with said abutments one by one for driving the elongated member in the last mentioned direction, a carrier for said pawl, an actuating lever for the pawl and a guide lever, said levers being pivoted to the pawl at separated points, pivotally mounted at more widely separated points, and otherwise so arranged and limited in their vibrating movements as to guide the pawl in a path which carries it entirely clear of the elongated member at one end of its path and then toward the elongated member and substantially parallel to the path of movement thereof in the course of its operating movement.

8. In an apparatus of the character described, a frictionally driven disk, a mechanical drive for propelling said disk forward, and means for turning the disk backward to starting position comprising a sprocket wheel connected to the disk, an endless sprocket chain surrounding and meshing with said wheel, means for supporting said chain with a straight stretch, and means for driving the chain to return the disk, said means comprising a pawl, a pawl carrier, means for reciprocating said pawl carrier so as to propel the pawl back and forth in a path generally parallel to the straight stretch of the chain, and guiding means organized to cause such deviation of said path from the chain that the pawl, when at one end of such path is withdrawn clear of the chain.

9. The apparatus as set forth in claim 8 in which the guiding means for the pawl carrier comprises a pivoted arm connected to said pawl carrier so as to be approximately perpendicular to the specified stretch of the chain when the pawl is at one limit of travel, and pivotally supported in such relation to the chain that its swing causes the pawl to be drawn toward the chain in the course of such travel.

10. The apparatus as set forth in claim 8 in which the driving and guiding means for the pawl comprises levers pivotally mounted and pivotally connected to the pawl carrier at separated points, so arranged that they impart lateral components of motion in respectively opposite directions to the points of the carrier to which they are connected in the course of the reciprocating travel of the pawl carrier.

11. In an apparatus of the character described, a connector latch, an obstructor therefor moving into and out of obstructing position, an electric motor coupled with said obstructor for moving it from the non-obstructing to the obstructing position, a circuit breaker for said motor operable by said obstructor after lapse of a predetermined time, and means for moving the obstructor into non-obstructing position.

12. An apparatus as set forth in claim 11 in which the circuit breaker comprises a switch, a traveling member connected with the obstructor to be driven thereby, and a switch opening device carried by said traveling member.

13. An apparatus as set forth in claim 11 in which the circuit breaker comprises a switch, a chain coupled with the obstructor to be driven thereby, and a switch opening trip carried by the chain in a path which causes it to engage and open the switch.

14. A parking meter comprising a casing, a timing mechanism therein, a connector insertible into the casing, means operable by the inserted connector for starting said timing mechanism, a displaceable latch for securing the inserted connector having a lug movable in a prescribed path when the lock is so displaced, a latch obstructor frictionally driven by the timing mechanism consisting of a disk having a skirt movable across the path in which said lug moves, but containing a notch through which the lug may pass at any time before the end of a predetermined time period, means for returning the obstructing means to initial position which consists of a pawl on the latch and an abutment on the obstructing means engageable and displaceable by said pawl when the latch is moved to release the connector, and other means for returning the disk after the end of said time period.

15. In an apparatus of the character described having a connector-securing latch, a movable obstructor having means for preventing release of the latch after movement through a given distance from its starting position, a motor frictionally coupled with said obstructor for driving it in the direction to cause obstruction of the latch, an elongated member having spaced abutments coupled with said obstructor to be driven thereby and to transmit retrograde movement thereto, a manually operable impeller for transmitting step by step retrograde movement to said elongated member, a lock normally preventing such operation of said impeller, and coin controlled means for releasing said lock.

16. In an apparatus of the character described, a driving motor, a time measuring element driven thereby, step by step operating means for returning said element, a lock for preventing operation of said last named means, coin controlled means for releasing said lock, and means operable by the time measuring element for releasing the lock independently of the coin controlled means.

17. In an apparatus as set forth in claim 16, the coin controlled means consisting of a switch in the electric circuit of an electro magnet, said switch being operable by a deposited coin, and the means operable by the time measuring element being another switch in parallel circuit with the same electro magnet.

18. An apparatus of the character described comprising an electric motor, a time measuring element frictionally coupled with said motor to be driven thereby and being independently returnable to starting position, a chain geared to said time measuring element to be impelled thereby and impart retrograde movement thereto, a switch in the circuit of the electric motor, a switch opener controlled by said chain to open the circuit of the motor after a predetermined time of running, a back and forth movable chain driver having means for engaging the chain and moving the same backwardly in the course of its successive movements in one direction, and manual means for moving said chain driver.

19. An apparatus set forth in claim 18 and comprising further a lock normally preventing movement of said manual means, an electro magnetic device for releasing said lock, and means carried by the time measuring element for putting said lock releasing device into action.

20. An apparatus as set forth in claim 18 and comprising further a lock normally preventing movement of said manual means, an electro magnetic device for releasing said lock, a coin controlled switch in circuit with said electro magnetic means for putting the same into action upon deposit of a coin, and means carried by the time measuring element for putting said lock releasing device into action.

ELMER L. NICHOLS.